United States Patent [19]
Conrad

[11] 3,831,243
[45] Aug. 27, 1974

[54] METHOD FOR MAKING SELF-CENTERING PULLEYS

[75] Inventor: Rene Conrad, San Mateo, Calif.

[73] Assignee: Dynaloc Corporation, San Mateo, Calif.

[22] Filed: Sept. 24, 1973

[21] Appl. No.: 400,425

[52] U.S. Cl............ 29/148.4 D, 29/159 R, 29/475, 29/121 H, 74/230.5
[51] Int. Cl............................ B21h 1/14, B21k 1/02
[58] Field of Search.......... 29/159 R, 478, 482, 475, 29/148.4 D, 148.4 R, 477.7, 121 R, 121 H, 127; 74/230.5, 241; 228/15, 17, 5; 219/59, 62, 58

[56] References Cited
UNITED STATES PATENTS

| | | | |
|---|---|---|---|
| 867,336 | 10/1907 | Barmore | 29/121 H |
| 957,440 | 5/1910 | O'Brien | 29/148.4 D |
| 1,437,009 | 11/1922 | Perkins | 29/121 H |
| 1,563,704 | 12/1925 | Gries | 29/121 H |
| 1,568,401 | 1/1926 | Griffith | 29/121 H |
| 3,101,526 | 8/1963 | Paullus et al. | 29/475 X |

*Primary Examiner*—Charles W. Lanham
*Assistant Examiner*—V. A. DiPalma
*Attorney, Agent, or Firm*—Schatzel & Hamrick

[57] ABSTRACT

A method and apparatus for making self-centering pulleys wherein strips of half-round wire are tapered over their lengths so as to have a half-round configuration at one end and a substantially flattened configuration at the opposite end and are then spirally wrapped about a cylindrical drum and affixed thereto by spot welding. The apparatus includes a knurling and wire deforming device for effecting the tapering of the wire strips as the strips are fed onto the cylindrical drum, and a welding device for spot welding the wire strips to the drum surface as they are spirally wound thereabout.

5 Claims, 8 Drawing Figures

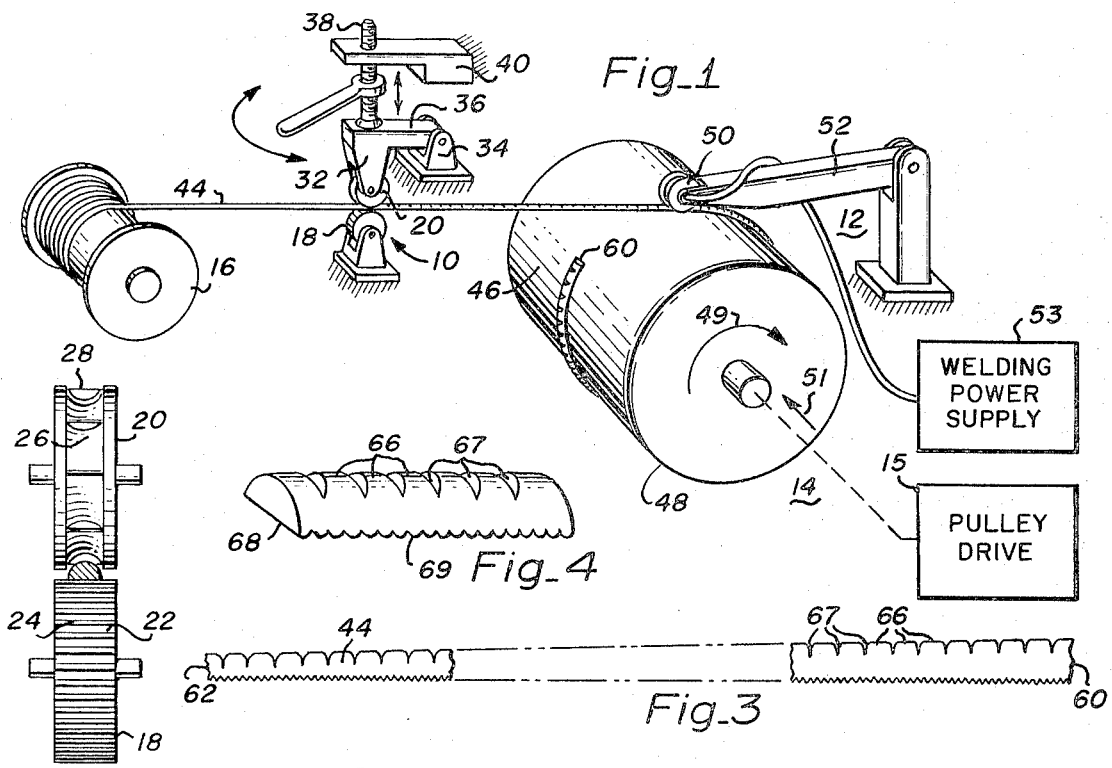
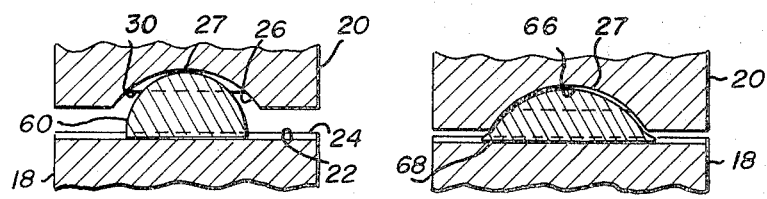
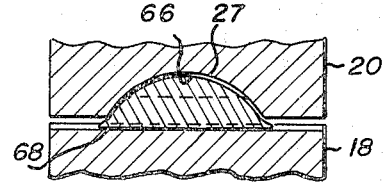
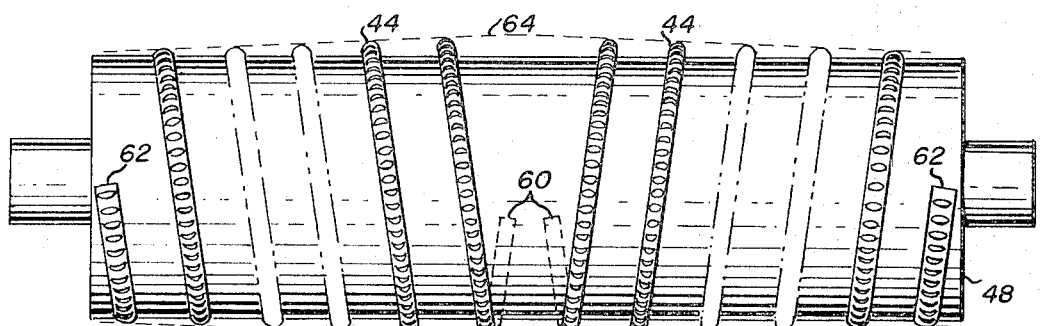
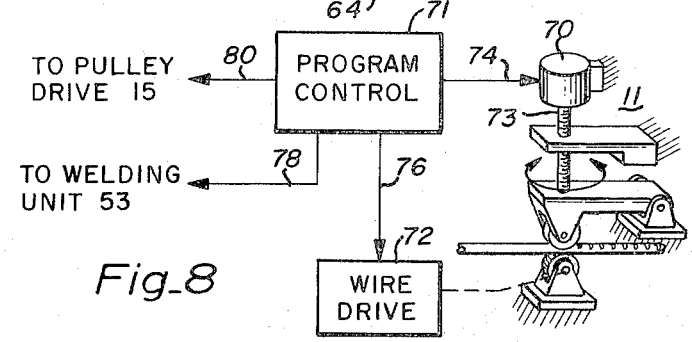

3,831,243

METHOD FOR MAKING SELF-CENTERING PULLEYS

BACKGROUND OF THE INVENTION

1. Field of the Invention

The present invention relates to methods and apparatus for making self-centering pulley devices and more particularly to a method and apparatus of the type described wherein lengths of wire are tapered, knurled and then applied to the surface of a cylindrical drum to form a crowned pulley having spirally tending ribbing.

2. Description of the Prior Art

Self-centering pulleys having spirally tending ribbing have been known and used for some time and in the past have been made using a number of techniques including those disclosed in the U.S. Pat. Nos. to Alvey 1,095,445; Griffith 1,568,401; Whitney 1,660,538; Lorig 2,622,448 and Conrad et al 3,713,348. As disclosed in these references, typical methods of making such pulleys include the use of cast moldings, spiral wrapping techniques and machining operations, or a combination of these, to effect the desired ribbed pulley configuration. For example, a popular prior art method of making ribbed pulleys was to spirally wrap and affix lengths of uniform wire to the surface of a cylindrical pulley drum. Where it was desired that the pulley be crowned, the crown was achieved by either using a pre-crowned drum and applying the lengths of uniform wire thereto, or by machining spiraled grooving of varying depth along the length of the drum for receiving the lengths of uniform wire.

Although such practices have resulted in the provision of pulleys which are quite suitable for the intended applications, the methods of manufacturing suffer from the disadvantage of requiring several operative steps which typically necessitate the use of expensive precision molding or milling equipment. This of course affects the time required for manufacture, the number of workers who must be involved in the manufacturing process, and as a direct result of these factors, the ultimate cost of manufacture of the pulleys.

SUMMARY OF THE PRESENT INVENTION

It is therefore a principal objective of the present invention to provide a novel method and apparatus for making self-centering pulleys in a simple, expeditious and relatively inexpensive manner.

In accordance with a presently preferred embodiment of the present invention, lengths of half-round malleable wire are fed through a knurling and deforming means to progressively alter the cross-sectional dimensions thereof and the lengths of wire are then spirally wrapped directly about a cylindrical drum and affixed to the surface thereof by spot welding. One length of tapered wire is normally wound in one direction about one-half of the roller, while another length of tapered wire is wound in the opposite direction about the other half of the drum.

Among the advantages of this invention over the prior art is the crowned pulley structures, suitable for both drive and idler applications, may be fabricated in a much more expeditious and efficient manner than has heretofore been practiced in the prior art.

Other objects and advantages of the present invention will no doubt become apparent to those or ordinary skill in the art after having read the following detailed description of the preferred embodiments which are illustrated in the several figures of the drawing.

IN THE DRAWING

FIG. 1 is a sketch schematically representing the components of a self-centering pulley making apparatus in accordance with the present invention;

FIG. 2 is a front view showing the upper knurling and deforming wheel and the lower knurling wheel illustrated generally in FIG. 1;

FIG. 3 is an exaggerated side view of a length of wire knurled and tapered in accordance with the present invention;

FIG. 4 is a perspective view of a small segment of wire deformed and knurled in accordance with the present invention;

FIG. 5 is a partial cross-section of the deforming and knurling wheels and wire shown in the knurling but non-deforming configuration;

FIG. 6 is a partial cross-section of the deforming and knurling wheels shown in an advanced deforming configuration;

FIG. 7 is a side view of a self-centering pulley made in accordance with the present invention; and FIG. 8 is a schematic representation suggesting an automated self-centering pulley making apparatus in accordance with the present invention.

DETAILED DESCRIPTION OF THE PREFERRED EMBODIMENTS

As indicated above, one of the principal problems encountered in the prior art methods of making self-centering pulleys which are both ribbed and crowned is related to the methods of manufacture heretofore used. This is particularly true in those cases wherein crowning is achieved by machining grooves of varying depth into the surface of a cylindrical roller drum and then disposing lengths of wire of uniform cross-section into these grooves so that the projections of the wire above the surface of the drum simultaneously provide both ribbing and crowning.

My new method obviates the aforementioned problem by eliminating the machining requirement and provides pulleys which are similar in both physical appearance and operation to the prior art structure. More particularly, the present method includes tapering a pair of strips of half-round wire along their lengths so that their transverse sections vary from the half-round configuration at one end to a thinner circular segmental section at the other end. During the tapering process, the wire is also knurled on its top and bottom sides for reasons which will be explained below. As each of the lengths of wire is tapered, it is wound in spiral fashion about a cylindrical roller drum and spot-welded thereto to provide the desired crowned ribbed pulley structure.

Referring now to FIG. 1 of the drawing, a schematic representation is provided of apparatus suitable for implementing the present invention and includes a wire deforming and knurling unit 10, a welding unit 12, a drum support and drive system 14, and a wire supply spool 16. The principle components of unit 10 are a lower knurling wheel 18 and an upper knurling and deforming wheel 20. The lower wheel 18 is journaled to a bracket 20 affixed to a suitable support structure (not shown). As further illustrated in the front view shown in FIG. 2, wheel 18 has a generally cylindrical face 22 upon which are formed fine knurling ridges or teeth 24 which extend across face 22 in a direction generally parallel to the axis of the wheel.

Although not shown for purposes of simplicity, wheel 18 may also be driven by a suitable prime mover for advancing the wire to be tapered through the unit 10.

Upper knurling and deforming wheel 20 is disposed immediately above wheel 18, but instead of having a plain cylindrical face, it is provided with a concave wire engaging face 26 which has a generally circular section that is perhaps more clearly shown in FIGS. 5 and 6. Face 26 has an arcuate radius which normally has about twice the radius of the wire to be deformed thereby. The knurling ridges or teeth 28 extend laterally across and project into the annular cavity formed by the arcuate face 26 a distance equivalent to approximately one-half the depth of the wire receiving cavity. In the preferred embodiment, the knurling teeth 28 project outwardly far enough so that an undeformed wire can be given a 120° knurl.

Wheel 20 is carried by an arm 32 which is pivotally mounted to the support by a bracket 34. The upper surface 36 of arm 32 is engaged by one end of a threaded jack-screw 38 that is threaded into a bracket 40 also affixed to the common support structure. Affixed to jack-screw 38 and extending transverse thereto is a jack handle which, when rotated in a horizontal plane, causes jack-screw 38 to advance or retreat relative to bracket 40, and in so doing, to move upper wheel 20 either towards or away from lower wheel 18.

Spool 16 carries a supply of half-round wire 44 of a generally D-shaped cross-section which is fed through unit 10 for tapering and knurling, as will be explained below, and then wrapping in spiral fashion about the exterior surface 46 of a drum 48 which is carried by apparatus 14. Pulley support and drive system 14 includes suitable means for both rotating and axially translating the drum 48 relative to the wire feed position at a rate suitable for effecting the desired positioning and spiral wrapping wire strips on the drum surface 46. The drum 48 is rotated and displaced axially at selected and controlled rates in order to effect the spiral wrapping of the wires 44 about its outer circumference.

As the wires are wrapped about drum 48, they are engaged by a welding head 50 which causes the wire to be spot-welded to surface 46 at regular intervals. The roller-shaped welding head 50 is affixed to a support arm 52 and forms part of the resistance welding unit 12. The power supply 53 periodically applies welding current to head 50 for application to wire 44 to effect spot welding of the wire to the drum at regular intervals.

The completed pulley structure is illustrated in FIG. 7 and includes a cylindrical drum 48 about which the tapered strips of wire 44 are spirally wrapped and affixed. It will be noted that since the strips 44 are tapered with the thickest ends 60 being affixed to the center portion of roller 48 and the thinnest ends 62 being affixed to the ends of roller 48, a crowning illustrated by the dashed lines 64 is achieved.

Referring now back to FIG. 1 of the drawing, the operation of the present apparatus will be described. At the outset, jack-screw 38 is rotated so as to position upper wheel 20 at a separation from lower wheel 18 so that the distance between the innermost portion 27 (FIG. 5) of face 26 and face 22 is approximately equal to the diameter of the half-round wire 44. The end 60 of wire 44 is then threaded into position between the wheels and drawn therethrough toward pulley 48. As the wire is drawn therethrough, the jack handle is slowly rotated at a rate which will cause the separation between roller faces 26 and 22 to diminish toward a minimum separation, such as that illustrated in FIG. 6, at the time that end 62 of the wire strip 44 passes therethrough.

As the strip 44 passes through unit 10 and is tapered, both the upper surface 66 and the lower surface 68 are knurled as shown in FIGS. 3 and 4. The upper surface knurling 67 is deeper and wider than the lower surface and has the purpose of providing good frictional gripping with material engaged by the pulley. On the other hand, the fine knurling 69 on the lower surface 68 is to aid welding of strip 44 to drum surface 46. As the end 60 of wire 44 is passed through unit 10, it is aligned either manually or by suitable guides (not shown) with welding head 50. At this point the center portion of drum 48 is positioned beneath head 50.

Upon being engaged by welding head 50, end 60 is spot-welded to surface 46 by current supplied to head 50 from power supply 53. Thereafter pulley drive 15 causes pulley 14 to commence rotation in the clockwise direction as indicated by arrow 49, and to be translated into the background of the drawing as indicated by arrow 51, so that wire 44 is wrapped about drum 48 in the desired spiral configuration. As the wrapping action occurs, power supply 53 continues to apply periodic welding pulses to head 50 causing the lower surface 68 of strip 44 to be spot-welded to surface 46.

As the wrapping and welding operation is taking place, the tapering of wire 44 by unit 10 is also simultaneously occuring. When the required length of wire 44 has completed its transit through unit 10, wheel 20 is retracted upwardly and wire 44 is severed. After the end 62 has been welded to drum 48, welding head 50 is also lifted up and pulley drive 15 is actuated to reposition the center of drum 48 back under welding head 50. The operation is then repeated for a second strip 44 except that drum 48 is translated in the direction of the foreground of the drawing so that the second strip is spirally wound in the opposite direction and affixed to the opposite end of the drum 48 to complete fabrication of the pulley.

Turning now to FIG. 8 of the drawing, an automated embodiment of the apparatus shown generally in FIG. 1 is suggested wherein instead of the manual jacking device 10, a power driven unit 11 is utilized which includes a servo motor 70 for turning jack screw 73. In addition, the lower knurling wheel 18 is driven by a drive unit 72. A program control unit 74 is also provided in this embodiment which is capable of generating a servo control signal on line 74 for driving motor 70, a drive control on line 76 for actuating drive unit 72 and suitable output signals on lines 78 and 80 for driving welding unit 53 and pulley drive unit 15 respectively. The entire fabrication process may thus be automated. In other words, once the end 60 of a strip of wire 44 is fed into unit 10 and program control unit 71 is actuated, the entire pulley fabrication process can be completed without any additional manual operation.

Although the structure disclosed above is only schematically represented, it is contemplated that many alternative choices of structural implementing embodiments as well as modifications and alterations of both the disclosed method and apparatus will become apparent to those skilled in the art. For example, other welding techniques might be used to affix wire 44 to drum 48, and more than one wire applying system might be provided so as to simultaneously apply two or more wires to a drum, and head 50 might be displaced rather than fixed. Accordingly, I intend that the following claims be interpreted as covering all such modifications and alterations as fall within the true spirit and scope of the invention. In the appended claims, thickness is deemed to mean the dimension of the wire transverse to the strip length and normal to the lower surface to be applied to the drum surface. Similarly, width is deemed to mean the wire dimension in the direction transverse to the strip length as affixed to the drum and generally parallel to the axis of the drum.

What is claimed is:

1. A method of making a self-centering pulley, comprising the steps of tapering a first strip of wire along its length so that its thickness varies from a first dimension at one end to a second dimension at the other end;

tapering a second strip of wire along its length so that its thickness varies from said first dimension at one end to said second dimension at the other end;

wrapping said first strip in spiral fashion about one-half of a generally cylindrical drum with the end having the greatest thickness being closest to the center of said drum;

wrapping said second strip of wire in spiral fashion about the other half of said drum with the end having the greatest thickness being closest to the center of said drum; and affixing said strips to the surface of said drum as they are wrapped thereabout.

2. A method of making a self-centering pulley as recited in claim 1 and further comprising knurling the tapered strips of wire before they are affixed to the drum.

3. A method of making a self-centering pulley as recited in claim 2 wherein said knurling is accomplished simultaneously with the tapering of the strips of wire.

4. A method of making a self-centering pulley as recited in claim 1 wherein said strips of wire have a generally D-shaped cross-section.

5. A method of making a self-centering pulley as recited in claim 1 wherein said strips of wire and said drum are both metallic and said strips of wire are affixed to said drum by welding.

* * * * *